Dec. 22, 1942.   A. A. STUART, JR   2,306,361
RATE MEASURING DEVICE
Filed Oct. 3, 1942   3 Sheets-Sheet 1

INVENTOR.
Alfred A. Stuart, Jr.
BY Stephen Gerstvik
ATTORNEY.

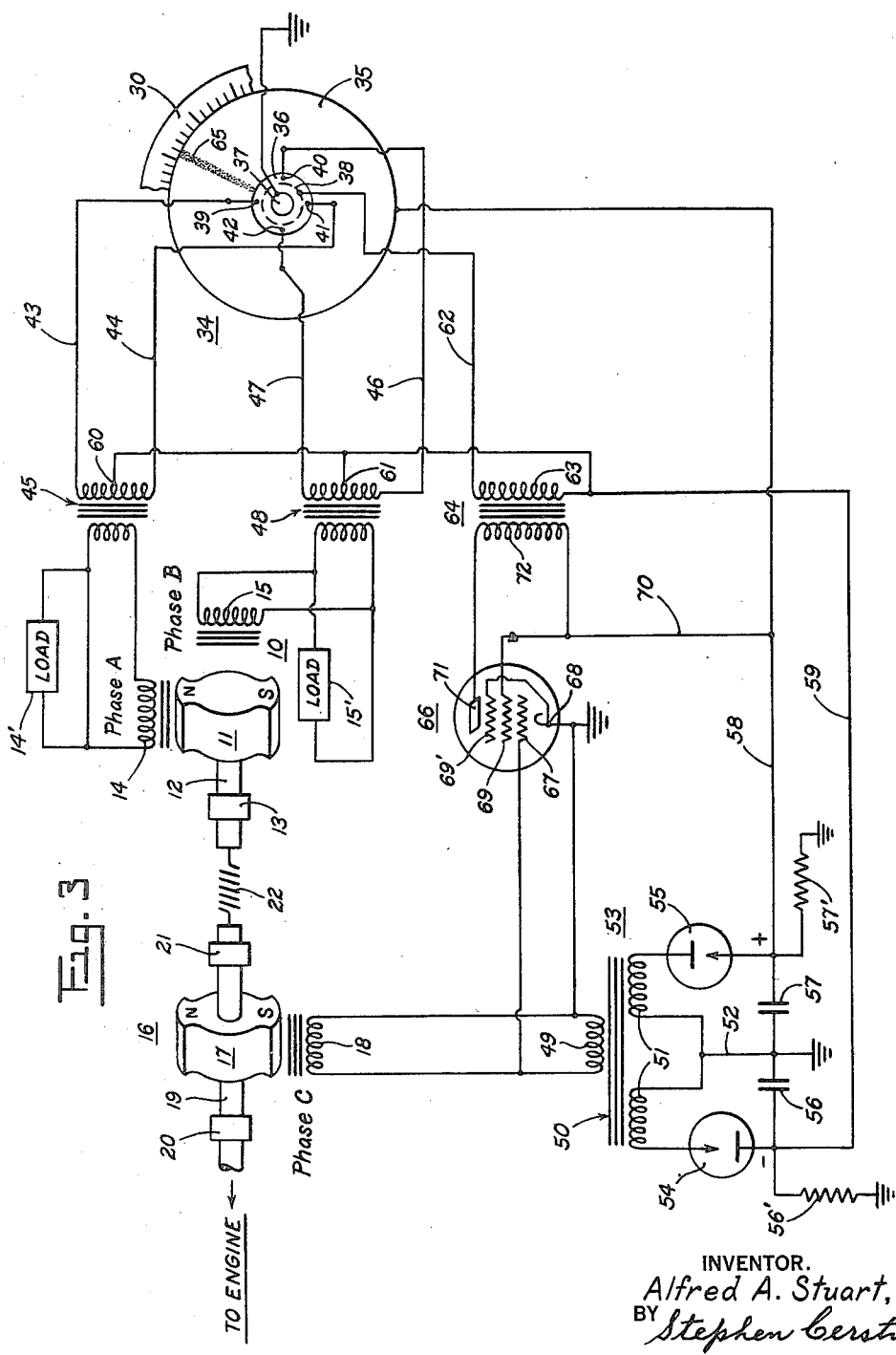

Dec. 22, 1942.    A. A. STUART, JR    2,306,361
RATE MEASURING DEVICE
Filed Oct. 3, 1942    3 Sheets-Sheet 3
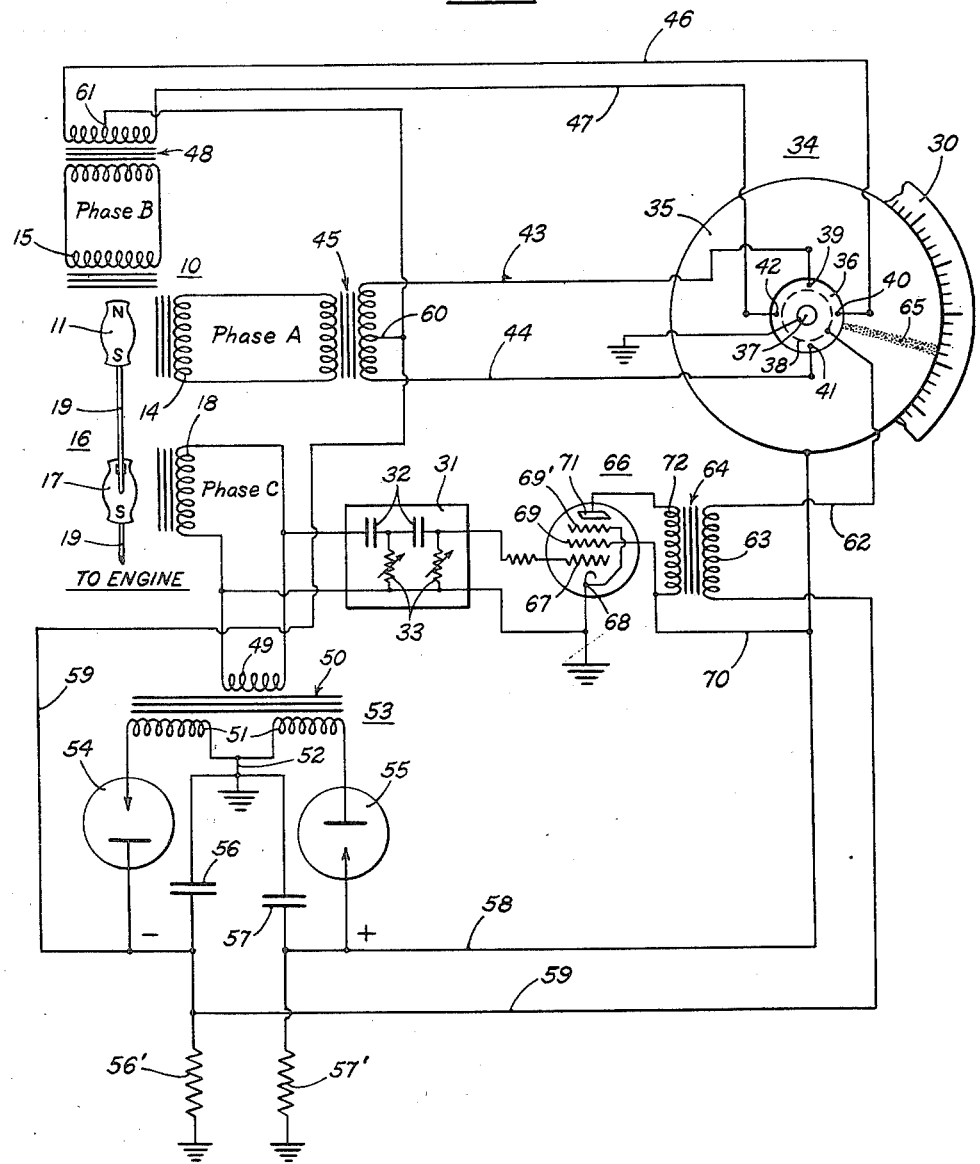
INVENTOR.
Alfred A. Stuart, Jr.
BY Stephen Cerstvik
ATTORNEY.

Patented Dec. 22, 1942

2,306,361

UNITED STATES PATENT OFFICE 2,306,361

RATE MEASURING DEVICE

Alfred A. Stuart, Jr., Hasbrouck Heights, N. J., assignor to Bendix Aviation Corporation, Bendix, N. J., a corporation of Delaware Original application March 27, 1941, Serial No. 385,577. Divided and this application October 3, 1942, Serial No. 460,673

3 Claims. (Cl. 172—245)

The present invention relates to rate measuring devices of a type which may be readily adapted to the measurement of rotative speeds, and is a division of copending application Serial No. 385,577, filed March 27, 1941.

It is an object of the present invention to provide a shaft tachometer, wherein the speed of the shaft may be measured by displacement of the phase of one voltage source with respect to the phase of another voltage source.

Another object of the invention lies in the provision of a shaft tachometer wherein the phase of the voltage of one source may be shifted with respect to the phase of the voltage of another source in accordance with the speed of a driving shaft.

Other objects include the provision of a rate indicating device wherein the indicating element may be a self-synchronous motor or a cathode ray beam tube of novel construction, and the provision of a tachometer particularly adapted for giving remote indications of shaft speed.

Another object of the invention is to provide a novel shaft tachometer wherein the phase of the voltage of one source is shifted with respect to the phase of another source, either mechanically by a resilient coupling or electrically by a phase-shifting network, in accordance with the speed of a driving shaft, and wherein the indicating element is of the electronic type such as a cathode ray tube, for example.

Other objects will appear from a study of the following specification when made in conjunction with the attached drawings, throughout which like numerals designate like parts.

Fig. 3 is a diagrammatic representation of a third embodiment of the invention; and Fig. 4 is a diagram of a fourth embodiment of the invention.

In accordance with the present invention, two generators of alternating current are driven by a shaft, the speed of which it is intended to measure, and a phase-shifting device is provided for shifting the phase of the voltage of one generator with respect to the voltage of the other in accordance with the rotative speed of the driving shaft. One of the generators may be polyphase while the other is single phase. The phase-shifting device may be either mechanical or electrical, and the indicating device may be a polyphase electric motor or a cathode ray tube, with a cathode ray beam functioning as a pointer to indicate the rotative speed of the driving shaft.

Figure 1:
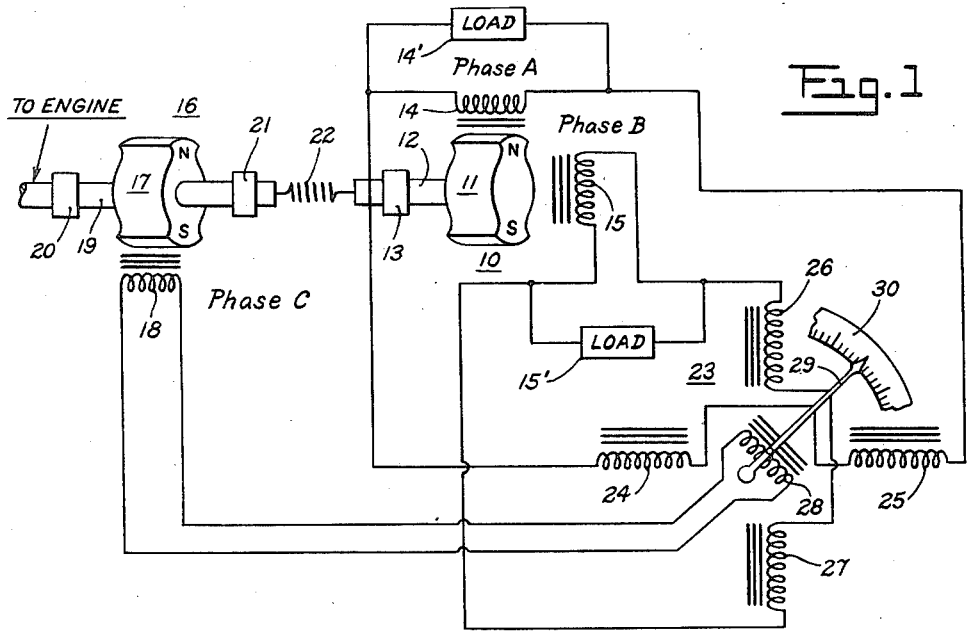
Fig. 1 is a schematic diagram of one form of the invention.

Having particular reference to Fig. 1, 10 represents a polyphase alternator having a rotor 11, which may be a permanent magnet of "Alnico" or of any other suitable material, carried on a shaft 12 supported in a bearing member 13, which is schematically shown. Alternator 10 has a stator portion, which includes a phase winding 14 designated as phase A, and a phase winding 15 designated as phase B at 90 degrees to phase A. A single phase alternator 16 has a rotor 17, which may be a magnet of "Alnico," or other suitable material, and a stator including a phase winding 18, designated as phase C. Rotor 17 is carried by a shaft 19 journaled in bearing members 20 and 21, which are schematically shown. Shaft 19 is coupled by any suitable means to the shaft of the engine, not shown, the speed of which it is intended to measure. A spring member 22 is interposed between shafts 12 and 19, and while it is schematically represented, it may be a spiral, a leaf spring or any other conventional type of spring.

An indicating member includes a polyphase motor 23, having stator windings 24 and 25 connected in series with phase A, and stator windings 26 and 27, connected in series with phase B. A rotor member 28 which carries a pointer 29, is connected to the single phase winding 18 of alternator 16. Motor 23 may be of the self-synchronous type known as an "Autosyn" or "Selsyn," wherein the position of the rotor with respect to the stator will depend on the phase relation between the voltages in the stator and in the rotor. A scale member 30, which may be circular, but which is shown broken away, coacts with pointer 29 in order to give an indication of the rotative speed of the engine shaft.

Spring member 22 is designed so that upon rotation of shaft 19 by the engine, shaft 12 will be carried along with shaft 19, but at a phase displacement which varies with the torque imposed upon spring 22.

Ordinarily the torque developed in a generator varies substantially in accordance with the speed of rotation of the armature, but in order to insure that the torque vary directly with the speed of rotation, an impedance load 14' is placed across the output of winding 14 and a similar impedance load 15' is placed across the output of winding 15. The proper relation of impedances that make up loads 14' and 15' may be selected for any given generator 10 so that the desired torque-speed relation will be maintained. A workman skilled in the art will be capable of ascertaining the right value for loads 14' and 15' and further explanation thereof is accordingly believed to be unnecessary.

As equal increments of speed of the engine shaft bring about equal increments of the torque thereof, it will be seen that the physical phase relation of rotors 11 and 17 will be varied in accordance with the speed of the engine shaft, thus the voltages generated in phases A and B will lag the voltage generated in phase C by an amount that varies with the speed of rotation of the engine shaft. The phase displacement by which the voltages in alternator 10 lag behind the voltage generated in alternator 16 is indicated by pointer 29 directly as R. P. M. on scale 30, if desired, since rotor 28 which carried pointer 29, will take up an angular position with respect to the stator of alternator 10 which depends on the speed of the engine shaft.

Phase C need have no particular initial phase relation to phases A and B, since regardless of the initial relation, it will be altered in the same manner as shaft 19 is rotated, but if desired, phase C may be in phase agreement with either of phases A or B when generators 10 and 16 are at rest.

Figure 2:
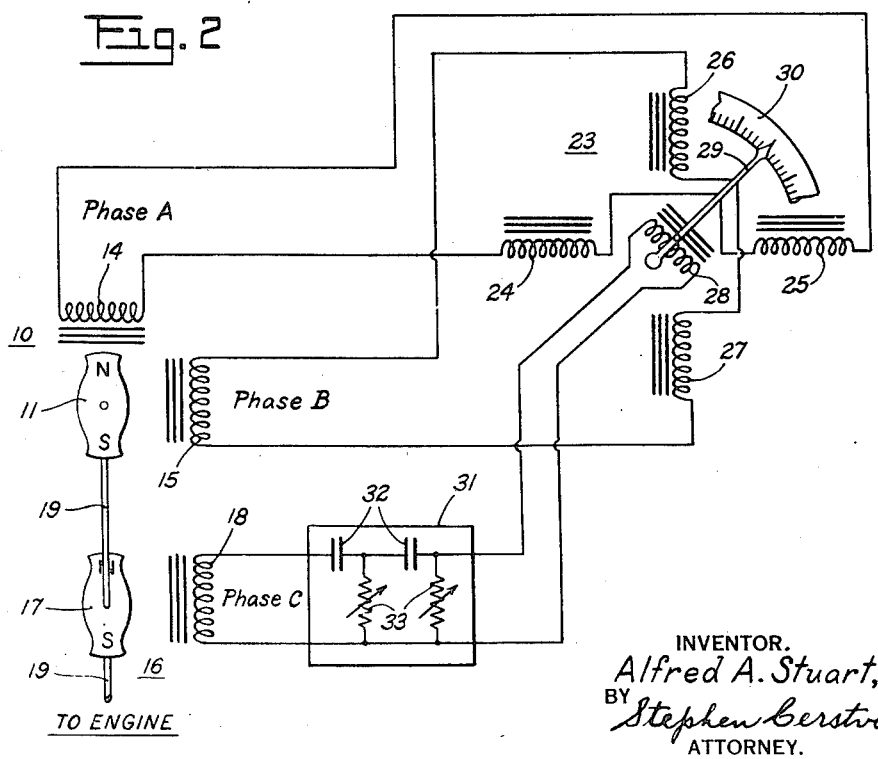
Fig. 2 is a diagram of a second embodiment of the invention.

The phase shift which indicates a change in engine speed may be brought about by an electrical, rather than a mechanical, phase shifting means, and in Fig. 2 rotors 11 and 17, of alternators 10 and 16, are rigidly connected to the engine-engaging shaft 19 and are preferably so aligned mechanically that there is zero mechanical phase displacement between identical points of each of the rotors secured to shaft 19. The output of phase 18 connects to the input of a phase shifting network 31 which may include any conventional electrical network system; for example, one comprising condensers 32 and resistors 33.

Whenever, in a given network, such as that shown at 31, the input frequency changes, a shift in the phase of the voltages applied will be brought about so that the voltage in the output of the phase shifting network will bear a definite phase relation to the voltage in the input thereof, and this phase relation will vary with the frequency of the input voltage. By using capacitances and resistors, having certain related values as will be understood by those skilled in the art, it is possible to shift the phase of the voltage from phase C in a linear relation with respect to the voltages generated in phases A and B, and as the angular speed of shaft 19 varies, the frequency shift of voltage in phase C varies accordingly.

Since phase shifting network 31 operates to linearly shift the phase of the voltage in stator 18 with respect to the speed of shaft 19, the phase of the voltage will be accordingly shifted by the same amount in rotor 28, and it will be apparent that pointer 29 will be rotated so that it indicates the amount of phase shift brought about for a given speed of rotation of shaft 19.

The novel tachometer herein disclosed may utilize a unique type of indicator, shown particularly in Figs. 3 and 4. This indicator is a thermionic vacuum tube of the type disclosed and claimed in U. S. Patent No. 2,283,103 dated May 12, 1942, and assigned to the same assignee as the present invention. This cathode ray tube is shown only schematically in Figs. 3 and 4, but it is believed its operation will be clear upon an explanation thereof.

A cathode ray vacuum tube 34 includes an annular anode member 35 coated with any suitable fluorescent material and having a central aperture 36. Within this aperture and coaxially of anode 35, there is positioned a cathode member 37 which may be of any conventional type, such as an indirectly heated cathode, and surrounding cathode 37 there is positioned a cylindrical wire mesh control grid member 38. Immediately outside control grid 38 and symmetrically spaced about cathode 37 within aperture 36 there are located four director electrode members 39, 40, 41 and 42, which may be short rods of small diameter, running parallel to the axis of anode 35. By means of leads 43 and 44, which are connected to opposite director electrodes 39 and 41, respectively, these electrodes are electrically connected in circuit with phase A through the transformer 45. Similarly, director electrodes 40 and 42 connect to leads 46 and 47, respectively, and are attached in circuit with phase B by means of transformer 48. It will be seen therefore, that director electrodes 39 and 41 are connected electrically 90 degrees out of phase with respect to director electrodes 40 and 42. Phase winding 18, which is phase C of alternator 16, is connected to the primary 49 of a transformer 50, having a secondary winding 51 center tapped and grounded at point 52.

When alternator 16 is in operation (that is, when rotating shaft 19 carries rotor 17), an alternating current, the frequency of which depends upon the speed of rotation of shaft 19, is generated. The energy generated is transformed, in transformer 50, into suitable voltage and current values to operate tube 34. The alternating current in the output of transformer 50 is rectified by means of a rectifying system 53 which will be now described. Diode 55 rectifies and passes positive half-cycles of energy from transformer 50, as indicated by the plus sign, and has a conventional filter condenser 57 connected to ground across its output. A bleeder resistor 57' is shunted across condenser 57 for the conventional purpose of discharging condenser 57, and thus preventing the accumulation of a high charge across condenser 57. The rectified voltage in the output of diode 55 is impressed upon anode 35 through lead 58. This voltage is of course positive and will be of the value desirable for the best operation of tube 34.

The diode 54 also rectifies the voltage in the output of transformer 50, but it is so poled with respect to diode 55 that it passes only negative half cycles of alternating current. A conventional filter condenser 56 is connected to ground across the output of diode 54 and a conventional bleeder resistor 56' is shunted across condenser 56 to prevent the accumulation of a high charge on condenser 56. A negative voltage of any suitable value is impressed upon director electrodes 39, 40, 41 and 42 through lead 59, center taps 60 and 61, and the secondaries of transformers 45 and 48, respectively. Further, a negative bias of a value sufficient to maintain control grid 38 in its cut-off condition is impressed by diode 54 by way of lead 59, secondary winding 63 and conductor 62.

The negative bias impressed upon control electrodes 39, 40, 41, and 42 is of such value that when it is combined with the signal voltages on these electrodes due to phase windings A and B of generator 10, emission of electrons from cathode 37 to anode 35 is restricted to a narrow beam 65, which will revolve synchronously with rotor 11 of alternator 10. Although the description herein is believed to be complete so that one skilled in the art may construct the invention in accordance with this disclosure, a detailed explanation of the operation of the novel cathode ray tube is contained in Patent No. 2,283,103 above-mentioned.

Synchronously revolving beam 65 cannot be read in motion as an indication of rotative speed, and therefore rectifier 54 is made to impress a normal negative bias upon anode 35, which bias of control grid 38 is removed for an instant in each revolution of shaft 19 at a particular angular position with respect to scale 30. This position depends upon the phase displacement between the rotors 11 and 17, and at this instant, beam 65 is formed on anode 35 by the action of electrodes 39, 40, 41 and 42. The means employed for instantaneously removing the negative bias of grid 38 includes a pulsing circuit comprising a thermionic device 66 of the pentode type which has its control grid 67 connected across phase winding 18 of alternator 16. This pentode has the usual cathode member 68 which is shown conventionally grounded to one side of phase winding 18. Cathode 68 may be of the indirectly heated type, and a battery or other source, not shown, may be utilized to heat cathode 68 to its emitting condition. An additional grid or control member 69, ordinarily called the screen grid, is connected to the positive output of rectifier diode 55 by means of conductors 70 and 58 and the conventional suppressor grid 69' is connected to cathode 68. Anode potential is provided for the anode 71 through the primary winding 72 of transformer 64.

It is characteristic of the pentode type of tube such as the 6L6, that its anode-cathode, or output, circuit will contain a current, the amount of which is controlled by the voltage on the control grid, but as this voltage is made negative beyond a certain definite point, the current in the output circuit is stopped or materially decreased at an exceedingly high rate for a minute change in grid voltage. When the grid voltage is cyclicly changed, as in the instant case, then this characteristic point will occur at the same point of the sine wave of voltage from alternator 16 once during each cycle, and the grid 67 will cut off the output current at the same high rate. The constant recurrence of this cut-off point once during each cycle affords a means whereby beam 65 is allowed to fluoresce or form on anode 35 in each cycle for the brief instant of cut-off of the anode-cathode current flowing through the primary 72 of transformer 64.

It is fundamental that when a current is stopped through a circuit including an inductance, a short pulse or surge of voltage occurs during the instant that the current is stopped, and if the inductance is relatively high, the pulse or surge reaches a peak voltage many times the voltage of the exciting source. The value of this peak depends principally on the amount of inductance in the circuit and the rate at which the current is stopped. As an example, it has been found that using a 6L6 type pentode, the rate at which the anode-cathode current is cut off by control grid 67 is such that, with only 12 volts on anode 71 and an inductance in primary 72 of 800 henrys, a pulse or surge of 120 volts (positive) is induced in the secondary 63 and impressed on control grid 38. The normal bias on control grid 38 sufficient to maintain beam 65 cut-off may be on the order of minus 50 volts, and it will be seen that for the brief instant that the pulse or surge of 120 volts exists, electrode 38 loses control and beam 65 fluoresces on anode 35 under the influence of director electrodes 39, 40, 41 and 42. Due to the persistence of the screen formed by the fluorescent material on anode 35 and to the persistence of vision, beam 65 will appear to be continuously on, and when the speed of shaft 19 is constant, beam 65 will appear to be stationary. When the shaft 19 is accelerating, pointer or beam 65 will appear to move in accordance with the rate of acceleration, in the same manner that the conventional mechanical pointer moves when the speed of the shaft or vehicle under observation changes.

The embodiment of the invention shown in Fig. 4 varies from that shown in Fig. 3 only by the use of the electrical phase shifting network 31, which is substituted for the spring member 22. The operation of phase shifter 31 is fully explained above in the description of Fig. 2 and since the operation of the pulsing tube 66 and the cathode ray tube 34 have been described in conjunction with the description of Fig. 3, it is believed that the operation of the embodiment shown in Fig. 4 will be readily understood.

The phase shifting network 31 is shown as being composed of resistances 33 and capacitances 32, but it will be understood that many impedance combinations of inductances and resistors, or inductances, capacitances and resistors may be employed. Further, it is obvious that rotor 11 of alternator 10 in Figs. 1 and 3 need not lag behind rotor 17 of alternator 16, as either rotor may be made to lead without changing the concept of the invention. While the rotors 11 and 17 have been shown as permanent magnets, they may be electromagnets if this seems preferable for certain uses of the present invention.

The loads 14' and 15' shown in Figs. 1 and 3 are electrical in character, but a mechanical load, such as a brake applying a drag to shaft 12 may be used instead, as will be readily appreciated.

The rate measuring instrument of the present invention may be used rather generally, but it is particularly well adapted to use on ships and in aircraft, where the engines under observation are at a considerable distance from the pilot's or navigator's station, since no flexible mechanical shafting is utilized to transfer indications. Flexible shafting is not only bulky and unwieldy for use over long distances but it also has inherent angular errors and adds considerable weight to the instrument. An added advantage of the present invention is that any number of repeater indications may be provided at different stations by merely placing a plurality of "Autosyns" 23 or cathode ray tubes 34 in parallel.

It will be understood that many changes, not herein specifically treated, may be made to the embodiments shown, without the exercise of invention. The invention is to be limited, therefore, not by the forms shown and described, but by the scope of the appended claims.

I claim:

1. A shaft tachometer comprising a first alternator having a rotor driven by said shaft and a stator, a second alternator having a rotor driven by said shaft and a polyphase stator, a cathode ray indicating device including an anode, means for impressing a positive potential thereon, an electron-emissive cathode, a plurality of control electrodes symmetrically spaced about said cathode, means for impressing a negative potential on said control electrodes, connections between said polyphase stator and said electrodes, a control grid, means for shifting the phase of the voltage of said first alternator with respect to the phases of voltages of said second alternator, and means in circuit with said control grid and said first alternator for limiting the interval of emission from said cathode to said anode to a unique point in each cycle of rotation of said shaft.

2. A device for indicating quantities representative of an operating condition of a shaft, comprising a first alternator having a shaft-driven rotor and a stator, a second alternator having a shaft-driven rotor and a stator, said rotors having a fixed angular phase relation when at rest, means interposed between said rotors to vary said angular phase relation in accordance with the speed of said shaft, a thermionic indicating device including an annular anode coated with fluorescent material, an electron-emissive cathode, a plurality of symmetrically spaced director electrodes about said cathode, a control grid electrode surrounding said cathode, symmetrical connections between the stator of one of said alternators and said director electrodes, a source of anode potential, the input of an electrical pulsing circuit connected to the stator of the other of said alternators, and a connection between the output of said pulsing circuit and said control grid electrode whereby emission of electrons from said cathode to said anode is restricted to a brief interval of a cycle of rotation of said shaft-driven rotors.

3. A device for indicating quantities representative of an operating condition of a shaft, including a first alternator having a stator and a shaft-driven rotor, a second alternator having a stator and a shaft-driven rotor, a cathode ray beam device including a sealed envelope, an annular anode coated with fluorescent material, a central cathode of electron-emissive material, a plurality of director electrodes spaced about said cathode in symmetrical arrangement, a control grid surrounding said cathode, symmetrical connections between said director electrodes and the stator of said first alternator, a pulsing circuit having its input energized by a circuit including the stator of said second alternator, its output connected to said control grid, and means for shifting the phase of the voltage from said second alternator with respect to the voltage from said first alternator in accordance with the speed of said shaft, said pulsing circuit acting to prevent electrons emitted from said cathode from forming a beam on said anode except for a brief interval in each cycle voltage from said second alternator, the occurrence of said interval varying with the phase-shift in voltage from said second alternator.

ALFRED A. STUART, Jr.